United States Patent
Hu

(10) Patent No.: US 8,676,271 B2
(45) Date of Patent: Mar. 18, 2014

(54) APPLICATION DISPLAYING METHOD AND MOBILE COMMUNICATION TERMINAL BASED ON USER'S HABIT

(75) Inventor: Wenming Hu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/494,362

(22) Filed: Jun. 12, 2012

(65) Prior Publication Data

US 2012/0252538 A1 Oct. 4, 2012

Related U.S. Application Data

(63) Continuation of application No. PCT/CN2011/070521, filed on Jan. 24, 2011.

(30) Foreign Application Priority Data

Jan. 27, 2010 (CN) .......................... 2010 1 0105116

(51) Int. Cl.
 *H04M 1/00* (2006.01)
(52) U.S. Cl.
 USPC ............ 455/566; 715/823; 396/128; 396/123
(58) Field of Classification Search
 None
 See application file for complete search history.

(56) References Cited

U.S. PATENT DOCUMENTS

| | | | |
|---|---|---|---|
| 6,297,795 B1 | 10/2001 | Kato et al. | |
| 2004/0247178 A1 | 12/2004 | Reese | |
| 2008/0055272 A1 | 3/2008 | Anzures et al. | |
| 2008/0270940 A1* | 10/2008 | Chang et al. | 715/823 |
| 2009/0169191 A1* | 7/2009 | Chien et al. | 396/48 |
| 2010/0317371 A1* | 12/2010 | Westerinen et al. | 455/456.6 |

FOREIGN PATENT DOCUMENTS

| | | |
|---|---|---|
| CN | 101083674 | 12/2007 |
| CN | 101349961 A | 1/2009 |
| CN | 101795321 | 8/2010 |
| CN | 101795321 B | 7/2012 |
| JP | 2000-332866 | 11/2000 |

OTHER PUBLICATIONS

English-language International Search Report for International Application No. PCT/CN2011/070521 mailed May 5, 2011 from The State Intellectual Property Office, the P.R. China, Beijing, China.
PCT Written Opinion of the International Searching Authority mailed May 5, 2011, issued in related International Application No. PCT/CN2011/070521, Huawei Device Co., Ltd. (4 pages).

* cited by examiner

*Primary Examiner* — Fayyaz Alam
*Assistant Examiner* — Mohammed Rachedine

(57) ABSTRACT

The present invention relates to the field of communications technologies, and provides an application displaying method and a mobile communication terminal based on a user's habit. The method includes: when the mobile communication terminal runs an application, acquiring a statistical value of displaying in a landscape manner and a statistical value of displaying in a portrait manner when the mobile communication terminal previously ran the application, comparing the statistical value of the landscape-manner displaying and the statistical value of the portrait-manner displaying to acquire a displaying manner corresponding to a larger displaying statistical value; and displaying a display interface of the application of the mobile communication terminal in the displaying manner corresponding to the larger displaying statistical value.

7 Claims, 3 Drawing Sheets

APPLICATION DISPLAYING METHOD AND MOBILE COMMUNICATION TERMINAL BASED ON USER'S HABIT

CROSS-REFERENCE TO RELATED APPLICATIONS

This application is a continuation of International Application No. PCT/CN2011/070521, filed on Jan. 24, 2011, which claims priority to Chinese Patent Application No. 201010105116.3, filed on Jan. 27, 2010, both of which are hereby incorporated by reference in their entireties.

FIELD OF THE INVENTION

The present invention relates to the field of communications technologies, and in particular, to an application displaying method and a mobile communication terminal based on a user's habit.

BACKGROUND OF THE INVENTION

A current intelligent mobile communication terminal supports a landscape displaying mode and a portrait displaying mode of applications, where the landscape or portrait displaying mode may be set manually after a user runs a corresponding application. In another technology, it is mainly automatically detected that the mobile communication terminal device is currently in a vertical or horizontal direction through a gravity sensor inside the mobile communication terminal to automatically switch displaying of the application to a landscape or portrait manner. For example, when an Android™ mobile phone works in a normal portrait manner, a user launches an application A, and according to the gravity sensor, the application A displays an interface in a portrait manner. However, due to the operational habit and the applicability degree of the user, the user wants a display in a horizontal direction and perform operations, so by placing the mobile phone in a lateral direction, the user makes, through the gravity sensor, the application A automatically switch to a landscape mode for displaying.

Whether the interface of the application the mobile communication terminal is displayed in the landscape or portrait displaying mode can be set manually after the corresponding application is run. The gravity sensor automatically detects that the mobile communication terminal device is currently in a vertical or horizontal direction so as to automatically switch the displaying of the application in a landscape or portrait manner. In practical applications, the mobile communication terminal is slow in response and a case of false switching frequently occurs. Sometimes, the screen is switched upon an unintentional movement while sometimes no response occurs at all. Therefore, requirements of the user cannot be met and the technology is not human friendly enough.

SUMMARY OF THE INVENTION

Embodiments of the present invention provide an application displaying method and a mobile communication terminal based on a user's habit. By memorizing a user's habit, a landscape manner or a portrait manner of a mobile communication terminal application, that meets the user's habit, is automatically selected to display an interface.

In one aspect, an embodiment of the present invention provides an application displaying method based on a user's habit. The method includes: when a mobile communication terminal runs an application, acquiring a statistical value of displaying in a landscape manner and a statistical value of displaying in a portrait manner when the mobile communication terminal previously ran the application; comparing the statistical value of the landscape-manner displaying and the statistical value of the portrait-manner displaying to acquire a displaying manner corresponding to a larger displaying statistical value; and displaying a displaying interface of the application of the mobile communication terminal in the displaying manner corresponding to the larger displaying statistical value.

In another aspect, an embodiment of the present invention provides a mobile communication terminal based on a user's habit. The mobile communication terminal includes: an acquisition unit, configured to, when the mobile communication terminal runs an application, acquire a statistical value of displaying in a landscape manner and a statistical value of displaying in a portrait manner when the mobile communication terminal previously ran the application; a comparison unit, configured to compare the statistical value of the landscape-manner displaying and the statistical value of the portrait-manner displaying to acquire a displaying manner corresponding to a larger displaying statistical value; and a displaying unit, configured to display a display interface of the application of the mobile communication terminal in the displaying manner corresponding to the larger displaying statistical value.

The aforementioned technical solutions have the following beneficial effects. By memorizing a user's habit, a landscape manner or a portrait manner of the application of the mobile communication terminal, where the landscape manner or portrait manner meets the user's habit is automatically selected to display the interface, so that the displaying manner of the application can respond to the user's use habit more rapidly.

BRIEF DESCRIPTION OF THE DRAWINGS

The accompanying drawings described herein are provided for further understanding of the present invention, which make a part of the application, but are not intended to limit the present invention. In the accompanying drawings.

DETAILED DESCRIPTION OF THE EMBODIMENTS

In order to make the objectives, technical solutions, and advantages of the present invention more clear, the present invention is further described in detail below in combination with embodiments and the accompanying drawings. Here, the exemplary embodiments of the present invention and descriptions thereof are only intended to explain the present invention, instead of serving as a limitation of the present invention.

Embodiment 1

Figure 1:
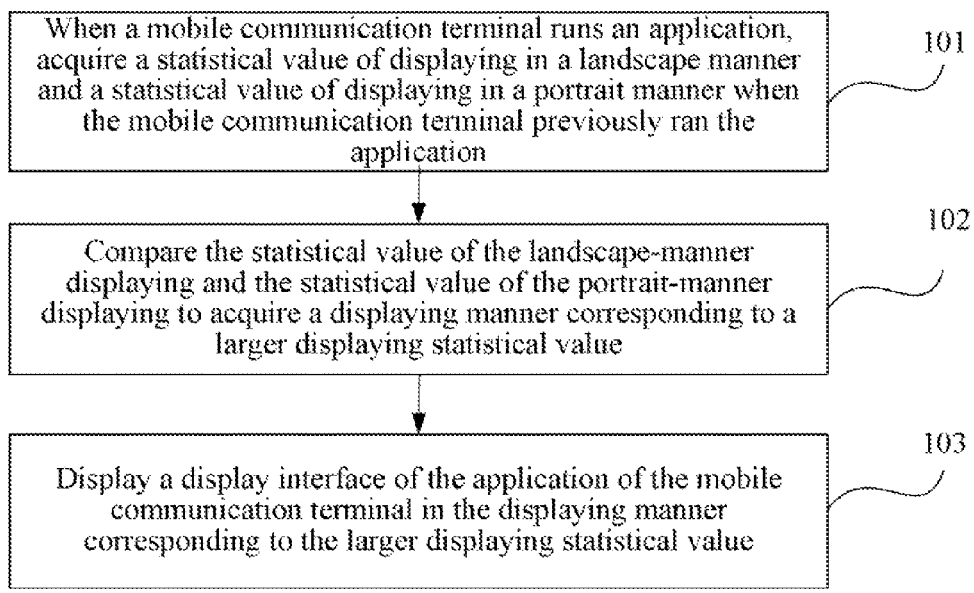
FIG. 1 is a flow chart of an application displaying method based on a user's habit according to an embodiment of the present invention.

FIG. 1 is a flow chart of an application displaying method based on a user's habit according to an embodiment of the present invention, and the method includes:

101: When a mobile communication terminal runs an application, acquire a statistical value of displaying in a landscape manner and a statistical value of displaying in a portrait manner when the mobile communication terminal previously ran the application.

Optionally, when the application of the mobile communication terminal is run, the statistical value of the landscape-manner displaying and the statistical value of the portrait-manner displaying of the application of the mobile communication terminal, which are larger than a preset statistical value, may be acquired. Before that, the method may further include: monitoring statistical conditions of the landscape-manner displaying and the portrait-manner displaying of each application of the mobile communication terminal, which may include: separately recording run time values and/or values of the numbers of times of the landscape-manner displaying and the portrait-manner displaying of each application; and separately accumulating the run time values and/or values of the numbers of times of the landscape-manner displaying and the portrait-manner displaying of each application, and then obtaining a time value and/or a value of the number of times of the landscape-manner displaying and a time value and/or a value of the number of times of the portrait-manner displaying of each application. The comparing the statistical value of the landscape-manner displaying and the statistical value of the portrait-manner displaying to acquire the displaying manner corresponding to the larger displaying statistical value may include: in a case of recording the run time values and the values of the numbers of times of the landscape-manner displaying and the portrait-manner displaying of each application, when the time values are close to each other, acquiring a displaying manner corresponding to a larger displaying value of the number of times by using the value of the number of times as a basis for comparison, and when the values of the numbers of times are close to each other, acquiring a displaying manner corresponding to a larger displaying time value by using the time value as a basis for comparison. The separately recording the run time values and/or the values of the numbers of times of the landscape-manner displaying and the portrait-manner displaying of each application, may include: recording the run time values and/or the values of the numbers of times of the landscape-manner displaying and the portrait-manner displaying of each application by using two parameters configland and configport in an APK (The APK is an abbreviation of Android™ Package, namely, an Android™ installation package. The APK is a file format similar to Symbian Sis or Sisx. The APK file may be directly transmitted to an Android™ emulator or an Android™ mobile phone to be executed for installation).

Step 102: Compare the statistical value of the landscape-manner displaying and the statistical value of the portrait-manner displaying to acquire a displaying manner corresponding to a larger displaying statistical value.

Step 103: Display a display interface of the application of the mobile communication terminal in the displaying manner corresponding to the larger displaying statistical value.

The aforementioned two statistical manners of recording the run time values and/or the values of the numbers of times of the landscape-manner displaying and the portrait-manner displaying of each application may be used separately. For example, during the landscape-manner displaying, the configland starts to accumulate time, and during the portrait-manner displaying, the configport starts to accumulate time. For example, after a mobile phone is used for a period of time, landscape and portrait use time of all applications are recorded. Meanwhile, due to different individual habits, the values of the parameter items, configland and configport, become different for different applications, and an item with a larger value may reflect an operational habit of a specific user. The user may also set to an initial state if necessary. Namely, the mobile phone is restored to the factory settings. The case of counting the value of the number of times is similar, which is not described again herein. The aforementioned two statistical approaches may also be used at the same time. For example, before the interface is displayed, the time value and the value of the number of times may be analyzed in combination to determine the landscape and the portrait displaying. When the time values are close to each other, the value of the number of times is used as an analysis basis, and when the values of the numbers of times are close to each other, the time value is used as the analysis basis.

In addition, different interfaces of one application may be processed separately. That is to say, for an application, a user prefers the portrait for some interfaces and prefers the landscape for some interfaces, so a launch interface and all interfaces during the execution of the application can be learned and memorized automatically. Meanwhile, when an application A invokes another application B, the habit for the application A may be transferred to the application B, so that the application B may also follow the displaying habit for the application A, thereby enhancing the user experience.

In the technical solution of the foregoing method according to the embodiment of the present invention, by memorizing a user's habit, the landscape manner or the portrait manner of the application of the mobile communication terminal, where the landscape manner or portrait manner meets the user's habit, are automatically selected to display the interface, so that the displaying manner of the application can respond to the user's use habit more rapidly, which is more human friendly and increases the usability and friendliness for the user's operations.

Embodiment 2

Figure 2:
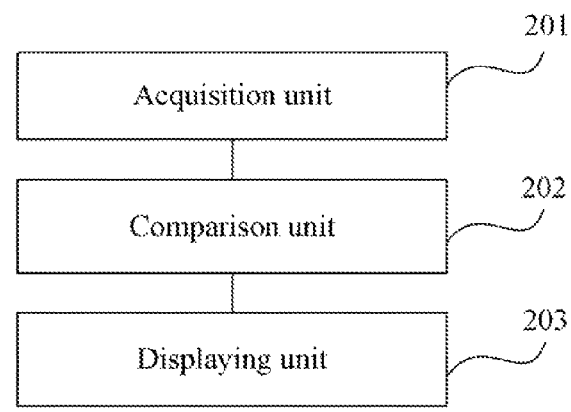
FIG. 2 is a schematic structural diagram of a mobile communication terminal based on a user's habit according to an embodiment of the present invention.

Corresponding to the aforementioned method embodiment, FIG. 2 is a schematic structural diagram of a mobile communication terminal based on a user's habit, where the mobile communication terminal includes:

an acquisition unit 201, configured to, when a mobile communication terminal runs an application, acquire a statistical value of displaying in a landscape manner and a statistical value of displaying in a portrait manner when the mobile communication terminal previously ran the application;

a comparison unit 202, configured to compare the statistical value of the landscape-manner displaying and the statistical value of the portrait-manner displaying to acquire a displaying manner corresponding to a larger displaying statistical value; and a displaying unit 203, configured to display a display interface of the application of the mobile communication terminal in the displaying manner corresponding to the larger displaying statistical value.

Figure 3:
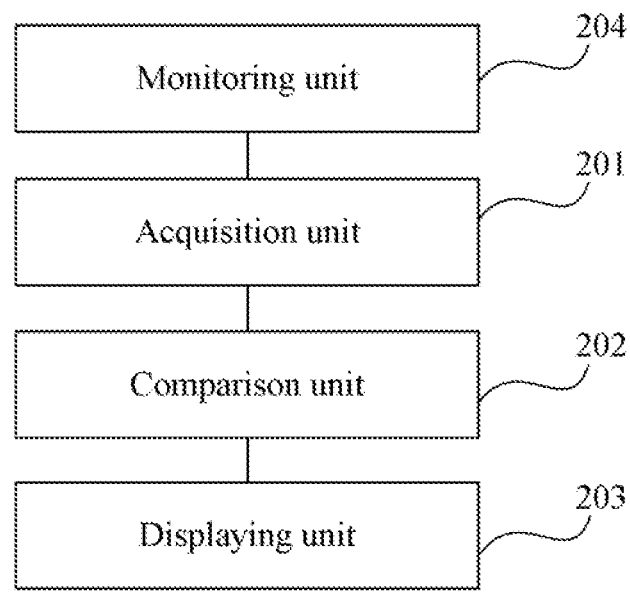
FIG. 3 is a schematic structural diagram of another mobile communication terminal based on a user's habit according to an embodiment of the present invention.
Figure 4:
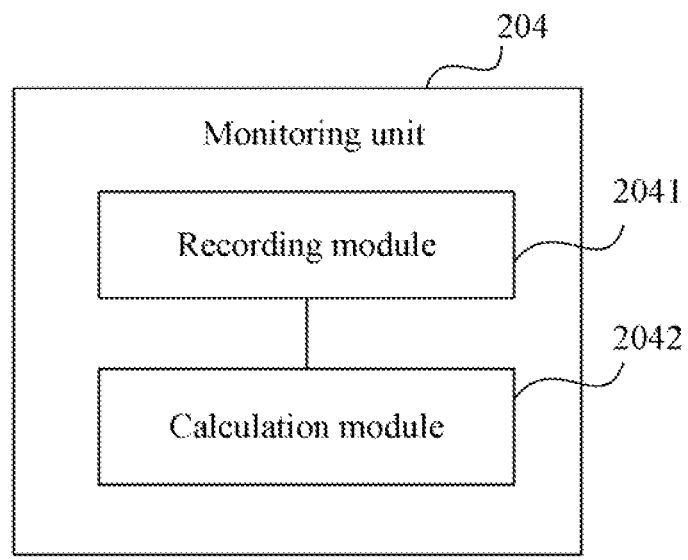
FIG. 4 is a schematic structural diagram of a monitoring unit according to an embodiment of the present invention.

Optionally, the acquisition unit 201 is further configured to, when the application of the mobile communication terminal is run, acquire the statistical value of the landscape-manner displaying and the statistical value of the portrait-manner display of the application of the mobile communication terminal, which are larger than a preset statistical value. FIG. 3 is a schematic structural diagram of another mobile communication terminal based on a user's habit according to an embodiment of the present invention, where the mobile communication terminal not only includes the aforementioned acquisition unit 201, comparison unit 202, and displaying unit 203, but also may include a monitoring unit 204, configured to monitor statistical conditions of the landscape-manner displaying and the portrait-manner displaying of each application of the mobile communication terminal. FIG. 4 is a schematic structural diagram of a monitoring unit according to an embodiment of the present invention, where the monitoring unit 204 may include: a recording module 2041, configured to separately record run time values and/or values of the numbers of times of the landscape-manner displaying and the portrait-manner displaying of each application; and a calculation module 2042, configured to separately accumulate the run time values and/or the values of the numbers of times of the landscape-manner displaying and the portrait-manner displaying of each application, and then obtain a time value and/or a value of the number of times of the landscape-manner displaying and a time value and/or a value of the number of times of the portrait-manner displaying of each application. The comparing, by the comparison unit 202, the statistical value of the landscape-manner displaying and the statistical value of the portrait-manner displaying to acquire the displaying manner corresponding to the larger displaying statistical value may include: in a case of recording the run time values and the values of the numbers of times of the landscape-manner displaying and the portrait-manner displaying of each application, when the time values are close to each other, acquiring a displaying manner corresponding to a larger displaying value of the number of times by using the value of the number of times as a basis for comparison, and when the values of the numbers of times are close to each other, acquiring a displaying manner corresponding to a larger displaying time value by using the time value as a basis for comparison. The recording module 2041 is further configured to separately record the run time values and/or the values of the numbers of times of the landscape-manner displaying and the portrait-manner displaying of each application by using two parameters configland and configport in an Android™ installation package.

Figure 5:
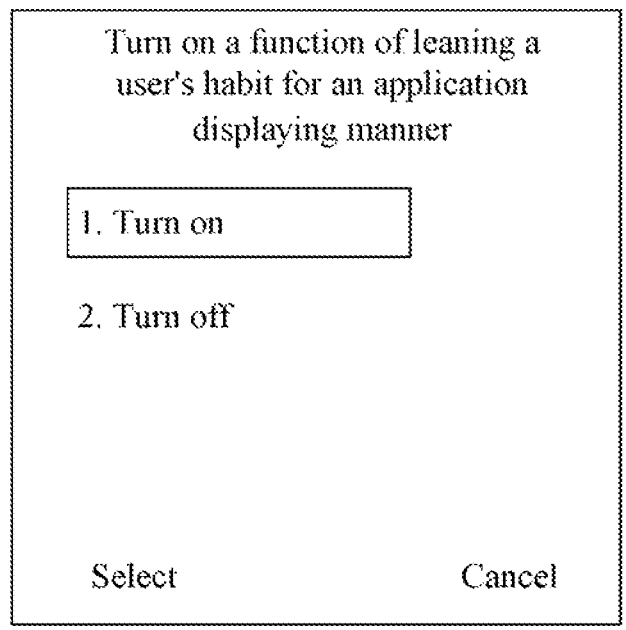
FIG. 5 is a schematic diagram of a menu option that a user selects whether to turn on a function of learning a user's habit for an application displaying manner according to an embodiment of the present invention.

In the aforementioned method and apparatus embodiments of the present invention, the new function provided by the mobile communication terminal may be set when the mobile communication terminal is delivered from a factory. Alternatively, according to menu options provided by the mobile communication terminal, a user may select whether to turn on the function of learning a user's habit for an application displaying manner. As shown in FIG. 5, when a user selects to turn on the function, the solutions of the embodiments of the present invention may be applied.

In the technical solution of the foregoing apparatus according to the embodiment of the present invention, when the application of the mobile communication terminal is run, the acquisition unit 201 acquires the statistical value of the landscape-manner displaying and the statistical value of the portrait-manner displaying of the application of the mobile communication terminal, which are larger than the preset statistical value; the comparison unit 202 compares the statistical value of the landscape-manner displaying and the statistical value of the portrait-manner displaying to acquire the displaying manner corresponding to the larger displaying statistical value; and the displaying unit 203 displays the display interface of the application of the mobile communication terminal in the displaying manner corresponding to the larger displaying statistical value. The technical effect of automatically selecting, by memorizing the user's habit, the landscape manner or the portrait manner of the application of the mobile communication terminal, where the landscape manner or the portrait manner meets the user's habit, to display the interface can be achieved. Therefore, the application displaying manner can respond to the user's use habit more rapidly, and the solution is more human friendly, and the usability and the friendliness of the user's operation are increased.

Persons of ordinary skill in the art should understand that all or part of the steps of the method according to the embodiments of the present invention may be implemented by a program instructing related hardware. The program may be stored in a computer readable storage medium, where the computer readable storage medium may includes a ROM, a RAM, a magnetic disk, or an optical disk, and so on.

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, or improvement made without departing from the spirit and principle of the present invention should fall within the protection scope of the present invention.

What is claimed is:

1. An application displaying method based on a user's habit, comprising:
  when a mobile communication terminal runs an application, acquiring a statistical value of displaying in a landscape manner and a statistical value of displaying in a portrait manner when the mobile communication terminal previously ran the application, which acquired statistical values are larger than a preset statistical value;
  separately recording run time values and/or the number of times of the landscape-manner displaying and the portrait-manner displaying of each application; and
  separately accumulating the run time values and/or the number of times of the landscape-manner displaying and the portrait-manner displaying of each application, and then obtaining a time value and/or the number of times of the landscape-manner displaying and a time value and/or the number of times of the portrait-manner displaying of each application;
  comparing the statistical value of the landscape-manner displaying and the statistical value of the portrait-manner displaying to acquire a displaying manner corresponding to a larger displaying statistical value, wherein in a case of recording the run time values and the numbers of times of the landscape-manner displaying and the portrait-manner displaying of each application, when the time values are close to each other, acquiring the displaying manner corresponding to a larger displaying number of times by using the number of times as a basis for comparison; and when the numbers of times are close to each other, acquiring the displaying manner corresponding to a larger displaying time value by using the time value as a basis for comparison; and
  displaying a display interface of the application of the mobile communication terminal in the displaying manner corresponding to the larger displaying statistical value.

2. The method according to claim 1, wherein separately recording the run time values and/or the number of times of the landscape-manner displaying and the portrait-manner displaying of each application, comprises:

separately recording the run time values and/or the number of times of the landscape-manner displaying and the portrait-manner displaying of each application, by using two parameters configland and configport in an Android™ installation package.

3. A mobile communication terminal based on a user's habit, wherein the mobile communication terminal comprises:

an acquisition unit, configured to, when a mobile communication terminal runs an application, acquire a statistical value of displaying in a landscape manner and a statistical value of displaying in a portrait manner, which acquired statistical values are larger than a preset statistical value, when the mobile communication terminal previously ran the application;

a comparison unit, configured to compare the statistical value of the landscape-manner displaying and the statistical value of the portrait-manner displaying to acquire a displaying manner corresponding to a larger displaying statistical value, wherein in a case of recording the run time values and the number of times of the landscape-manner displaying and the portrait-manner displaying of each application, when the time values are close to each other, acquiring the displaying manner corresponding to a larger displaying number of times by using the number of times as a basis for comparison; and when the numbers of times are close to each other, acquiring the displaying manner corresponding to a larger displaying time value by using the time value as a basis for comparison;

a displaying unit, configured to display a display interface of the application of the mobile communication terminal in the displaying manner corresponding to the larger displaying statistical value; and wherein the mobile communication terminal further comprises: a monitoring unit, configured to, before the acquisition unit acquires, when the application of the mobile communication terminal is run, the statistical value of the landscape-manner displaying and the statistical value of the portrait-manner displaying of the application of the mobile communication terminal, monitor statistical conditions of the landscape-manner displaying and the portrait-manner displaying of each application of the mobile communication terminal.

4. The mobile communications terminal according to claim 3, wherein the monitoring unit comprises:

a recording module, configured to separately record run time values and/or the number of times of the landscape-manner displaying and the portrait-manner displaying of each application, and a calculation module, configured to separately accumulate the run time values and/or the number of times of the landscape-manner displaying and the portrait-manner displaying of each application, and then obtain a time value and/or the number of times of the landscape-manner displaying and a time value and/or the number of times of the portrait-manner displaying of each application.

5. The mobile communication terminal according to claim 3, wherein the recording module is further configured to separately record the run time values and/or the number of times of the landscape-manner displaying and the portrait-manner displaying of each application, by using two parameters configland and configport in an Android™ installation package.

6. The method according to claim 1, wherein displaying in a landscape manner comprises displaying in a landscape orientation, and displaying in a portrait manner comprises displaying in a portrait orientation.

7. The mobile communication terminal according to claim 3, wherein displaying in a landscape manner comprises displaying in a landscape orientation, and displaying in a portrait manner comprises displaying in a portrait orientation.

\* \* \* \* \*